United States Patent [19]
Garriss

[11] Patent Number: 4,658,910
[45] Date of Patent: Apr. 21, 1987

[54] GARDEN TILLER PLOW TINE ASSEMBLY

[76] Inventor: Thurman W. Garriss, Box 51, Watha, N.C. 28471

[21] Appl. No.: 818,889

[22] Filed: Jan. 15, 1986

[51] Int. Cl.⁴ ............................................. A01B 33/02
[52] U.S. Cl. ..................................... 172/123; 172/548
[58] Field of Search ...................... 172/21, 25, 42, 43, 172/45, 94, 108, 118, 119, 123, 540, 548; 241/101–107; 366/345

[56] References Cited

U.S. PATENT DOCUMENTS

| | | | |
|---|---|---|---|
| 398,648 | 2/1889 | Paterson | 172/119 X |
| 1,807,489 | 5/1931 | Middleton et al. | 172/123 X |
| 2,754,744 | 7/1956 | Hall | 172/123 X |
| 3,078,555 | 4/1963 | Lester | 172/94 |
| 3,164,212 | 1/1965 | Vissers | 172/94 |
| 3,261,151 | 7/1966 | Breed et al. | 56/294 |
| 3,369,797 | 2/1968 | Cobey | 241/101.7 X |
| 4,133,390 | 1/1979 | Reaume | 172/43 |
| 4,256,182 | 3/1981 | Nething | 172/45 |
| 4,360,065 | 11/1982 | Jenison et al. | 241/101.7 X |

FOREIGN PATENT DOCUMENTS

| | | | |
|---|---|---|---|
| 176834 | 7/1935 | Switzerland | 172/25 |

Primary Examiner—Richard T. Stouffer
Attorney, Agent, or Firm—Henderson & Sturm

[57] ABSTRACT

A garden tiller tine assembly having an axle with a plate rigidly attached thereto. First blade structures are provided for engaging the soil and the blades are planar in configuration and have longitudinal axes. These blades are attached rigidly to the plate on one side in a plane obliquely disposed with respect to the horizontal axis of the axle, positioning a proximal edge of the first blade structure closest to the blade and a distal edge of the first blade farther from the plate than a proximal edge. Consequently, when the axle is rotated by a motor or the like in a first rotational direction, the proximal edge of the first blade will always be in front of the distal edge thereof whereby soil contact by the first blade will be thrown in a first lateral direction away from the plate. A second blade is attached to the other side of the plate. The second blade is identical to the first, except that it is oriented in an opposite direction such that when it rotates, it will throw the soil contacted toward the first blade. The first and second blades attached to the plate form a first assembly. A second assembly, which is essentially a mirror image of the first assembly, can be attached to one side of the first assembly to throw soil in a lateral direction opposite to the direction opposite to the direction of the first assembly to form a furrow in the soil between the first and second assemblies. If the position of the first and second assemblies are reversed, the assemblies will throw soil towards each other to form a ridge in the soil between the first and second assemblies.

8 Claims, 8 Drawing Figures

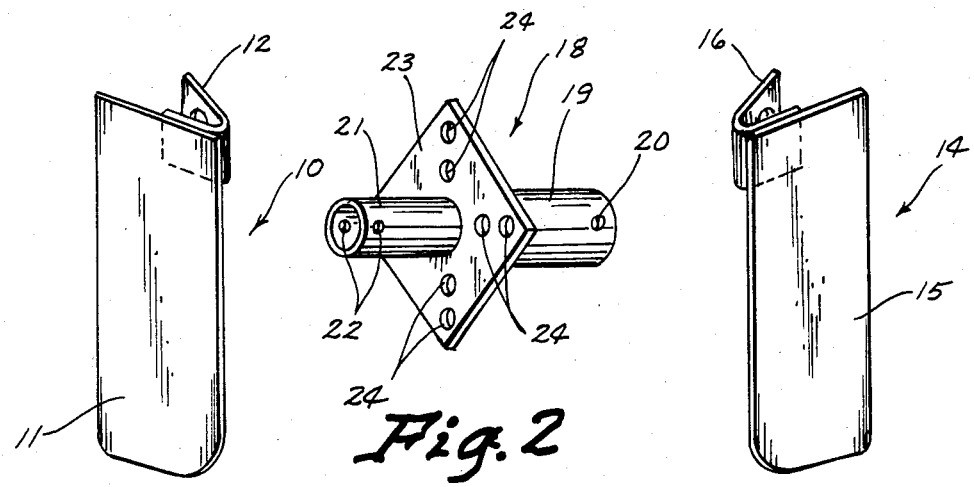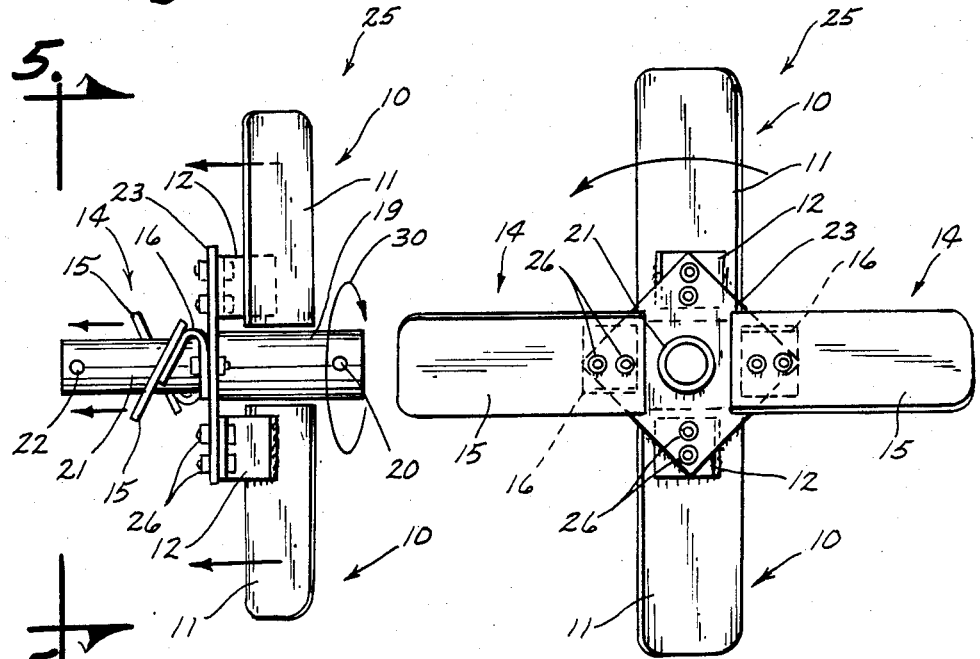

GARDEN TILLER PLOW TINE ASSEMBLY

TECHNICAL FIELD

The present invention relates generally to garden tillers and more particularly to a plow tine assembly for garden tillers.

BACKGROUND ART

Garden tillers having rotating blades have been utilized for decades. Such prior art devices typically dig up the ground to permit a seed bed to be later formed in the ground or for digging up the ground to kill weeds or remove sod or the like so that the plants to be planted do not have interference from other weeds or plants. While the prior art garden tillers do their intended tasks, they lack versatility because they cannot easily be converted to form a furrow for planting a seed bed or for covering up a seed bed and forming a ridge. Consequently, there is a need for a garden tiller tine assembly which will overcome the aforementioned deficiencies of the prior art.

DISCLOSURE OF THE INVENTION

The present invention relates generally to a garden tiller tine assembly having an axle with a plate rigidly attached thereto. First blade structures are provided for engaging the soil and the blades are planar in configuration and have disposed longitudinal axes. These blades are attached rigidly to the plate on one side in a plane obliquely disposed with respect to the horizontal axis of the axle, positioning a proximal edge of the first blade structure closest to the blade and a distal edge of the first blade farther from the plate than a proximal edge. Consequently, when the axle is rotated by a motor or the like in a first rotational direction, the proximal edge of the first blade will always be in front of the distal edge thereof whereby soil contacted by the first blade will be thrown in a first lateral direction away from the plate. A second blade is attached to the other side of the plate. The second blade is identical to the first, except that it is oriented in an opposite direction such that when it rotates, it will throw the soil contacted toward the first blade.

A second vertically disposed plate can be attached to the axle and has a third blade, identical to the first blade, and oriented to throw the soil in the second lateral direction. Also connected to the second plate is a fourth blade which is oriented to throw the soil in the second lateral direction toward the third blade.

In one arrangement, the second and fourth blades are shorter than the first and third blades and in such first arrangement, the soil is thrown outwardly laterally in the first and second lateral direction to form a furrow for forming a seed bed.

In a second arrangement of the garden tiller tine assembly, the first and second blades and the third and fourth blades are oriented such that they throw soil laterally inwardly towards each other to form a ridge for covering up the seeds planted or the like.

An object of the present invention is to provide an improved tiller tine assembly.

Another object of the present invention is to provide a tiller tine arrangement which is versatile enough to form either a ridge or a furrow.

A further object of the present invention is to provide a tiller tine assembly which is economical to produce and dependable to use.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of a blade for a garden tiller plow tine constructed in accordance with the present invention;

FIG. 2 is a perspective view of an axle and tine or blade connecting assembly constructed in accordance with the present invention;

FIG. 3 is a perspective view of a tine constructed in accordance with the present invention for the opposite side as the tine or blade shown in FIG. 1;

FIG. 4 is a side elevational view of a tiller tine assembly constructed in accordance with the present invention showing the blades of FIG. 1 on the right hand side thereof and the blades of FIG. 3 on the left hand side thereof;

FIG. 5 is a view taken along line 5—5 of FIG. 4;

BEST MODE FOR CARRYING OUT THE INVENTION

Figures 6, 7:
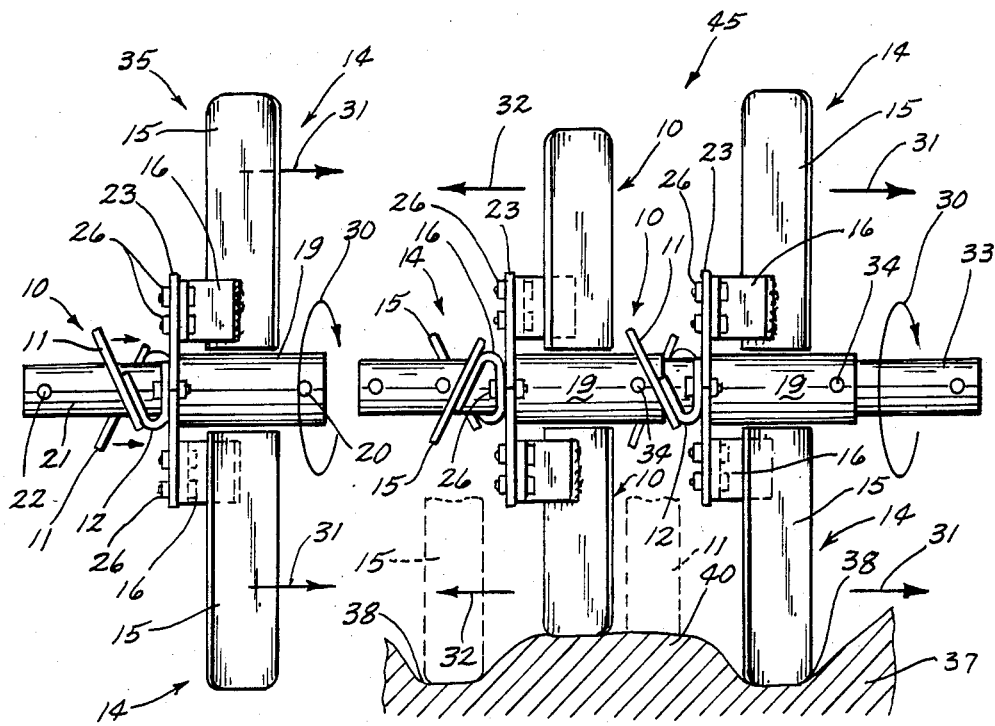
FIG. 6 is an assembly-like figure showing the tines of FIGS. 1 and 3 connected in such a way as to throw the soil in an opposite direction to that shown in FIG. 4; specifically it is noted that the FIG. 1 tines are mounted on the left side of the plate and the FIG. 3 tines are mounted on the right side of the plate.
FIG. 7 is a view of the assemblies of FIGS. 4 and 6 connected together in such a way that they rotate together to throw dirt outwardly, in opposite lateral directions from each other, so as to form a furrow having an elevated seed bed in the center thereof.

Referring now to the drawings wherein like reference numerals designate identical or corresponding parts throughout the several views, FIG. 1 shows a tine (10) having a blade (11) and a bracket (12) welded thereto. FIG. 3 shows a tine (14) having a blade (15) and a mounting bracket (16) welded thereto.

An assembly (18) is shown in FIG. 2 having an enlarged cylinder portion (19) having an opening (20) therein and a smaller tubular member (21) having an opening (22) extending therethrough. The cylinders (19) and (21) are welded to a central plate (23) having a plurality of openings (24) in each corner thereof.

It is noted that, referring to FIG. 4, an assembly (25) is formed by using one of the assemblies (18) shown in FIG. 2 along with two each of the tines (10) and (14) shown in FIGS. 1 and 3 and by use of nut and bolt assemblies (26) which extend through openings (24) in the plate (23) and through openings through the brackets (12) and (16).

Referring to FIG. 6, it is noted that an assembly (35) is shown which is a combination of use of the assembly (18) shown in FIG. 2 but having the blades (10) and (14)

attached to opposite sides from that shown in FIG. 4. The assembly shown in FIG. 6, when rotated in the direction of the arrow (30) in FIG. 6, will cause the soil contacted by the blades (11) and (15) to move to the right as shown by the arrows (31).

Referring now to FIG. 7, it is noted that an assembly (35) and an assembly (25), as shown in FIGS. 6 and 4 respectively, are linked together on a drive shaft (33) by utilizing pins (34) to interconnect such elements. This combined assembly of the drive shaft (33) which would interconnect to an engine or motor (36), shown schematically in FIG. 8, will form a larger assembly (45). This assembly (45) shown in FIG. 7, when rotated in the direction (30), will cause the blades (11) to throw soil laterally to the right in the direction of arrows (31) and into blades (15), which will continue to throw the soil laterally to the right as viewed in FIG. 7. Since the blades (11) are shorter than the blades (15), the soil (37) will form a ridge where the blade (11) contacts it and a valley where the blades (15) contact it. Similarly, referring to the assembly (25), the blades (11) will throw the dirt to the left in the direction (32) and into the blades (15), which will throw that dirt coming from the blade (11) and also the soil which it has dug up, laterally to the left as viewed in FIG. 7 thereby forming a furrow as shown in cross section in the soil (37).

Figure 8:
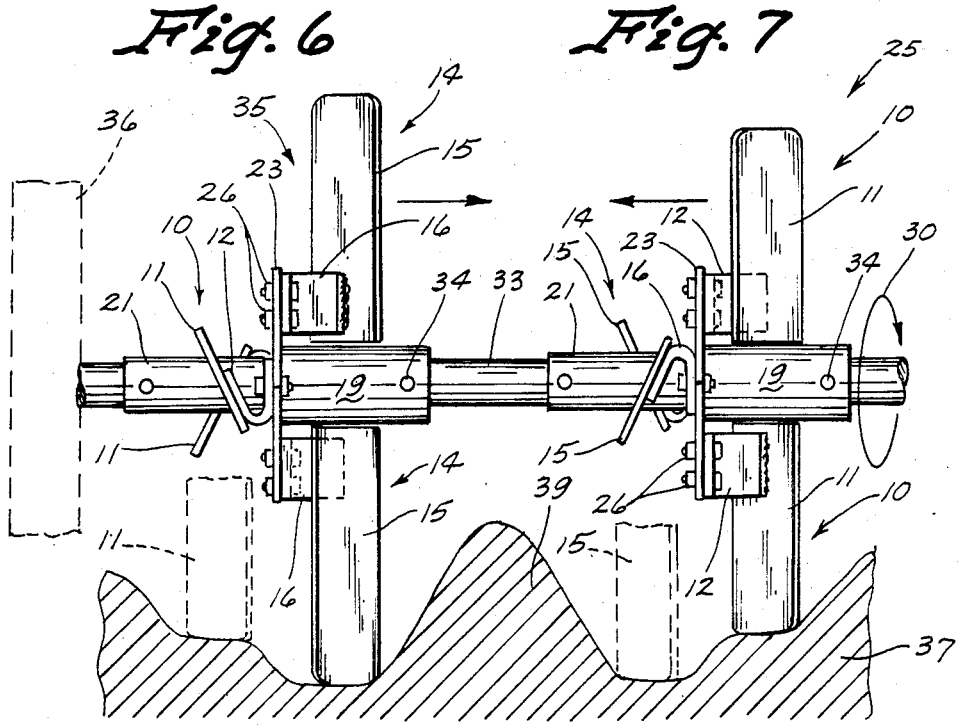
FIG. 8 shows an alternate arrangement of the tiller tine assemblies shown in FIGS. 4 and 6 wherein the FIG. 4 assembly is attached to an axle on the right side as shown in FIG. 8 and the FIG. 6 assembly is connected to an axle on the left side as shown in FIG. 8, such that the two assemblies throw dirt inwardly to form a ridge in the soil.

Referring now to FIG. 8, it is noted that one of the assemblies (35) is mounted on the left side of the axle (33) and one of the assemblies (25) and (35) will throw the soil inwardly toward the inner blades (15), which will continue to throw that soil plus whatever soil it has dug up inwardly into a ridge (39) between the assemblies (25) and (35). This can be used for example to cover seeds which have been planted in the soil (37) on the plateau (40) formed between the lowest portions (38) of the furrow shown in FIG. 7. The motor or engine (36), shown schematically in FIG. 8, would rotate as many units as desired which are attached to the axle (33) and in any combination desired in order to produce the final structure in the soil which is desired.

Obviously many modifications and variations of the present invention are possible in light of the above teachings. For example, any number of tines per section, different size of tines or angles of slope of the tines are possible. It is therefore to be understood that, within the scope of the appended claims, the invention may be practiced otherwise than as specifically described.

I claim:

1. A garden tiller tine assembly comprising:
   an axle adapted to be rotated about a substantially horizontal axis;
   a vertical disposed plate rigidly attached to said axle;
   a first blade means for engaging the soil, said first blade means being substantially planar in configuration and having a centrally disposed longitudinal axis;
   attaching means rigidly connecting the first blade means to said plate for at all times holding the first blade means to one side of said plate in a plane obliquely disposed with respect to said horizontal axis of said axle and positioning a proximal edge of said first blade means closest to said plate and a distal edge of the first blade means farther away from said plate than said proximal edge, and positioning said longitudinal axis of said first blade means to extend through said horizontal axis of rotation of said axle;
   means for rotating said axle and first blade means in a first rotational direction for causing the proximal edge of said first blade means to always be leading said distal edge in said first rotational direction whereby soil contacted by the first blade means will be thrown in a first lateral direction away from said plate;
   a second blade means for engaging the soil, said second blade means being substantially planar in configuration and having a centrally disposed longitudinal axis; and
   second attaching means rigidly connecting the second blade means to said plate for at all times holding the second blade means to the other side of said plate in a second plane obliquely disposed with respect to said horizontal axis of said axle and positioning a proximal edge of said second blade means closest to said plate and a distal edge of said second blade means farther away from said plate than said proximal edge of said second blade means, and positioning said longitudinal axis of said second blade means to extend through said horizontal axis of rotation of said axle, whereby when said axle and second blade means are rotated in said first rotational direction, the proximal edge of said second blade means will always be trailing said distal edge thereof in said first rotational direction whereby soil contacted by the second blade means will be thrown towards said first blade means.

2. The garden tiller tine assembly of claim 1 wherein said second blade means is shorter than said first blade means.

3. The garden tiller tine assembly of claim 1 comprising:
   a second vertically disposed plate rigidly attached to said axle;
   a third blade means for engaging the soil, said third blade means being substantially planar in configuration and having a centrally disposed longitudinal axis; and
   third attaching means rigidly connecting the third blade means to said second plate for at all times holding the third blade means to one side of said second plate in a plane obliquely disposed with respect to said horizontal axis of said axle and positioning a proximal edge of said third blade means closest to said second plate and a distal edge of the third blade means farther away from said second plate than said proximal edge of said third blade means, and positioning said longitudinal axis of said third blade means to extend through said horizontal axis of rotation of said axle, whereby when said axle and said third blade means are rotated in said first rotational direction, the proximal edge of said third blade means will always be leading said distal edge thereof in said first rotational direction whereby soil contacted by the third blade will be thrown in a second lateral direction opposite to said first lateral direction.

4. The garden tiller tine assembly of claim 3 comprising:
   a fourth blade means for engaging the soil, said fourth blade means being substantially planar in configuration and having a centrally disposed longitudinal axis; and
   fourth attaching means rigidly connecting the fourth blade means to said second plate for at all times holding the fourth blade means to the other side of said second plate in a plane obliquely disposed with respect to said horizontal axis of said axle and positioning a proximal edge of said fourth blade means closest to said second plate and a distal edge of the fourth blade means farther away from said second plate than said proximal edge of said fourth blade means, and positioning said longitudinal axis of said fourth blade means to extend through said horizontal axis of rotation of said axle, whereby when said axle and said fourth blade means are rotated in said first rotational direction, the proximal edge of said fourth blade means will always be trailing said distal end thereof in said rotational direction whereby soil contacted by the fourth blade means will be thrown in second lateral direction towards said third blade means.

5. The garden tiller tine assembly of claim 4 wherein said fourth blade means is shorter than said third blade means.

6. The garden tiller tine assembly of claim 5 wherein said second blade means is shorter than said first blade means.

7. The garden tiller tine assembly of claim 6 wherein said second and fourth blade means are adjacent to each other and said first and third blade means are remote from each other on said axle whereby said blade means are adapted to form a furrow having a raised seed bed ridge in the center thereof.

8. The garden tiller tine assembly of claim 6 wherein said first and third blade means are closer to each other on said axle than said second and fourth blade means whereby said blade means are adapted to throw soil together to form a ridge of soil between said first and third blade means.

* * * * *